United States Patent [19]

Buehler

[11] Patent Number: 5,304,708
[45] Date of Patent: Apr. 19, 1994

[54] ALLOYING METAL HYDROXIDE SLUDGE WASTE INTO A GLASS MATERIAL

[75] Inventor: Marvin L. Buehler, Orange, Calif.
[73] Assignee: Hughes Aircraft Company, Los Angeles, Calif.
[21] Appl. No.: 913,265
[22] Filed: Jul. 14, 1992
[51] Int. Cl.$^5$ .................................. B09B 3/00
[52] U.S. Cl. ........................ 588/256; 405/128; 588/252
[58] Field of Search ........... 588/249, 250, 252, 256, 588/257; 405/128, 129, 263

[56] References Cited

U.S. PATENT DOCUMENTS

| | | | |
|---|---|---|---|
| 4,320,028 | 3/1982 | Leuchtag | 405/128 X |
| 4,687,373 | 8/1987 | Falk et al. | 405/128 |
| 4,688,495 | 8/1987 | Galloway | 588/252 X |
| 4,701,222 | 10/1987 | Kobayashi et al. | 588/256 X |

Primary Examiner—David H. Corbin
Attorney, Agent, or Firm—Terje Gudmestad; Elizabeth E. Leitereg; W. K. Denson-Low

[57] ABSTRACT

A method for chemically stabilizing a hydroxide sludge waste material (10) having at least one contaminant is provided. The method of the present invention involves combining one or more oxides formed from each contaminants (11) contained within the hydroxide sludge (10) with at least one ionic binder (12) and glass-making oxides (14) to form a glass-compatible mixture. This mixture is melted, causing each ionic binder (12) to form a glass-compatible oxide, thus forming a glass oxide melt (18). Upon cooling, the glass oxide melt (18) forms a glass composition (20) containing each contaminant alloyed within its chemical structure.

11 Claims, 1 Drawing Sheet

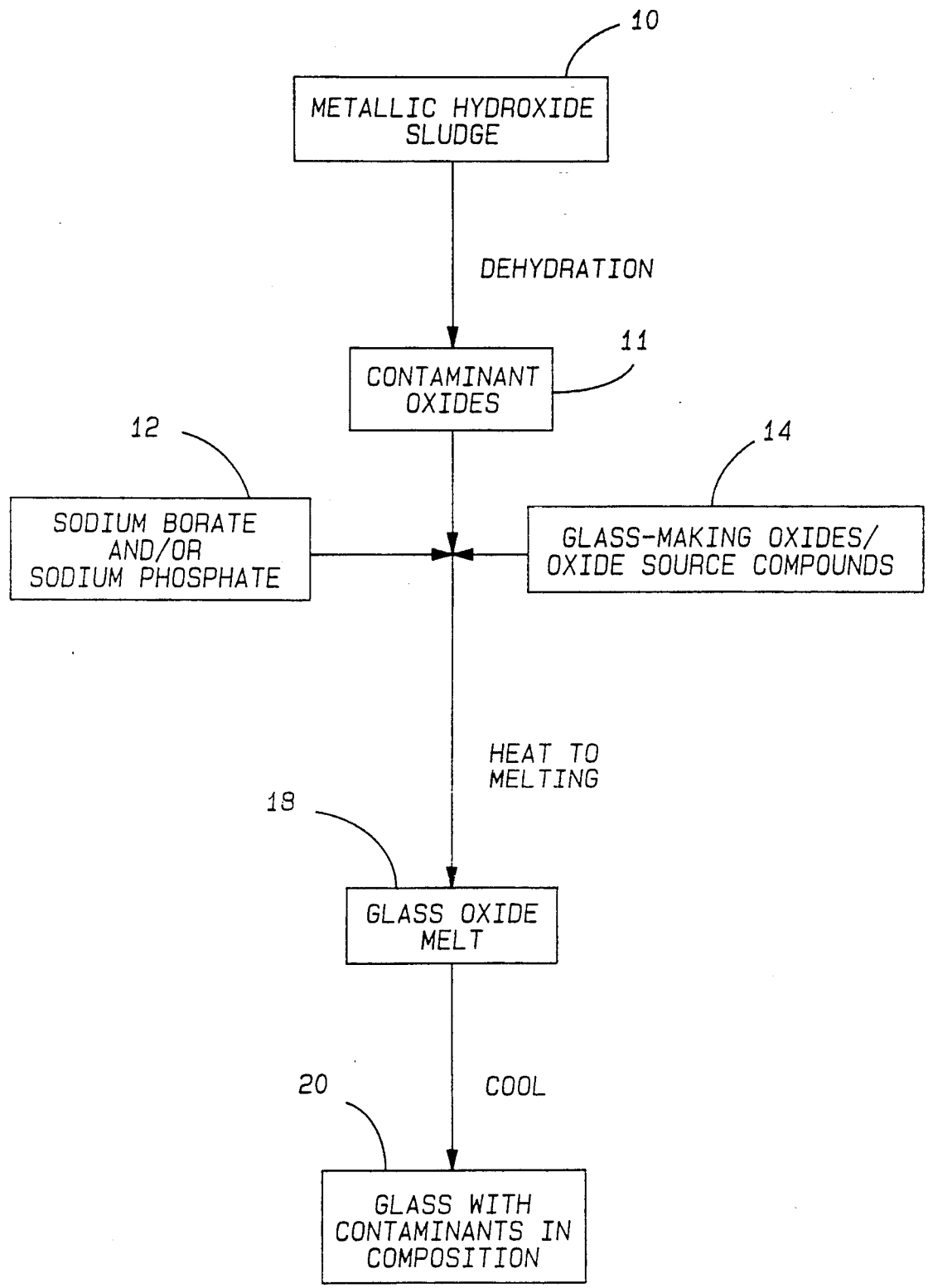

ALLOYING METAL HYDROXIDE SLUDGE WASTE INTO A GLASS MATERIAL

BACKGROUND OF THE INVENTION

1. Technical Field

The present invention relates generally to a method for converting waste material into an inert form and particularly concerns a method for alloying the ionic contaminants contained within a metal processing sludge waste material directly into the chemical structure of an inert glass material.

2. Discussion

Current metal processing techniques often produce waste solutions containing heavy metal and other ionic contaminants which are classified as hazardous wastes and require proper disposal. The types of metal processing sources for these waste solutions include chromium plating baths, copper circuit board manufacturing baths, alloy-brightening solutions, zinc plating solutions, electrolysis nickel-plating processes and lead-tin solder etching of copper circuit boards. A former method of disposal of these waste solutions throughout the metal processing industry involved the introduction of lime (calcium oxide) to the solutions containing the ionic contaminants. The introduction of lime caused an increase in the pH of the liquids and a precipitation of metallic and other hydroxides including the contaminants originally contained within the waste solutions. The resulting metallic hydroxide sludge waste material was then filtered to separate the metallic hydroxide precipitates from the filter liquor. The metallic hydroxides were then dehydrated to the oxide form and disposed of in a landfill which is conventional in the industry.

The disadvantage associated with this method of disposal involves the tendency of rain water or acidic materials coming into contact with the metallic hydroxide precipitates to solubilize the contaminants contained therein. This may cause the leaching of metallic contaminants from the landfill. Burying of metallic hydroxide waste sludge has thus become undesirable. In order to remedy this undesirable result, the use of these metal processes must be discontinued, or the contaminants must be removed from these metal processing waste solutions by the application of current costly stabilization processes. The discontinuation of their use entirely, however, would require a costly revision of the solutions currently used in the metal processing industry.

Alternative methods for stabilizing certain metallic elements for disposal are presently known. For example, it is possible to recover chromium from a waste solution by electroplating chromium from solution onto a stainless steel cathode. It is also currently possible to add a chelating agent, such as citric acid, to a waste solution containing iron to chelate the iron, after which the chelate complex is rendered inert and can be disposed of without harming the ground water supply. These methods, however, are both costly and time-consuming. Such stabilization processes also do not always ensure a safe containment of the metallic waste products, as the contaminants may still be susceptible to ground water and other solvent solubility.

The need therefore exists for a new method for stabilizing metallic elements from metal processing waste solutions into a chemically acceptable condition for disposal.

SUMMARY OF THE INVENTION

In accordance with the teachings of the present invention, a method for stabilizing the contaminants contained within a metallic hydroxide sludge waste material for containment and disposal is provided. The method of the present invention chemically bonds the contaminants from metallic hydroxide sludge waste into the structure of a glass composition, leaving the soluble contaminants in inert form.

The chemical stabilization of the contaminants within the hydroxide sludge is accomplished by the addition of compounds which chemically combine with the metallic cations from the metallic hydroxide sludge waste material, and will form glass-compatible oxides that mix with glass making oxides during melting, thus making glass. These compounds and glass oxide mixes can be stoichiometrically measured. Through this procedure, the contaminants are alloyed directly into the glass structure at the formation stage.

When alloyed into the glass composition itself, the contaminants are resistant to dissolution, erosion or corrosion forces and the glass composition can therefore be discarded and landfilled almost anywhere. In addition, the glass material can be cast into large or small brick-like forms for ease in handling, and can also be formed into decorative, colorful artistic sculpturing or figurine material.

Accordingly, it is an object of the present invention to overcome disadvantages associated with previous methods of disposal of waste metal processing solutions.

It is another object of the present invention to provide an improved method for disposing of the ionic contaminants present in metal processing solutions.

A further object of the present invention is to accomplish the disposal of metals from metal processing solutions in a cost effective manner.

Further understanding of the present invention, including additional benefits, objects and advantages, will be realized upon review of the drawings in view of the description thereof, detailed description of the preferred embodiments, the Examples and Claims appended hereto.

BRIEF DESCRIPTION OF THE DRAWINGS

The various advantages of the present invention will become apparent to one skilled in the art after reading the following specification and by reference to the drawing in which:

FIG. 1 is a flow chart illustrating the steps of a method in accordance with the teachings of the present invention, for alloying contaminants from a metallic hydroxide sludge waste material into the chemical structure of glass composition.

DETAILED DESCRIPTION OF THE PREFERRED EMBODIMENTS

It should be understood from the outset that while this invention is described in connection with a particular example, the scope of the invention need not be so limited since those skilled in the art will appreciate that its teachings can be used in a much wider variety of industrial applications than the examples specifically mentioned herein.

The preferred embodiments of the present invention will now be described with reference to FIG. 1. More particularly, FIG. 1 illustrates the steps of the method of the present invention by which contaminants are removed from a metallic hydroxide sludge (10) formed by prior art methods of metal processing solution disposal and are alloyed directly into the structure of a glass composition (20) during its formation.

The metallic hydroxide sludge (10) represents the material which has been produced for prior art methods of disposal from the previous addition of lime (calcium oxide) to waste solutions obtained from metal processing procedures. The metal processing solutions from which the metallic hydroxide sludge (10) has been precipitated typically include about 68% electroplating residue, about 2% metal stripping and about 30% etchant and electroless baths. The precipitation of hydroxides results from a raising of the waste solution pH by the lime.

In a preferred embodiment, the method of the present invention alloys aluminum, cadmium, calcium, chromium, copper, iron, lead, magnesium, manganese, nickel, phosphorous, potassium, silicon, sulfur, tin, titanium and zinc contaminants from waste solutions into a glass composition. Alternatively, it is within the scope of the present invention that other metallic and non-metallic contaminants can be removed from solution and alloyed into a glass composition using the present method.

In the method of the present invention, the contaminants to be disposed are converted into an oxide form and are combined with glass-making and glasscompatible oxides which facilitates the donation of the contaminants into a glass material (20). This is accomplished in a preferred embodiment during the melting of a mixture created by combining the desired glass making oxides (14), dehydrated sodium tetraborate ($Na_2B_4O_7$) and/or sodium metaphosphate ($NaPO_3$) (12) and oxides of the contaminants (11) formed from the dehydration of the metallic hydroxide sludge (10). It should be noted that the dehydration of the metallic hydroxide sludge (10) containing the contaminants converts the hydroxides of the contaminants to the oxide form. All of the components, contaminant oxides (11); sodium borate and/or sodium phosphate (12); and glass making oxides (14) are mixed dry at room temperature and then heated to melting, at which time the sodium borate and/or sodium phosphate (12) form glass-compatible oxides which together with the glass making oxides previously added constitute a glass oxide melt (18). Upon cooling, the glass oxide melt (18) forms the desired glass composition (20) containing the contaminants within its chemical structure. The stoichiometrical mix of components is determined from the chemical analysis of the dry metallic hydroxide sludge (10). It is necessary that the metallic hydroxide sludge (10), sodium tetraborate or sodium metaphosphate (12) and glass-making oxides (14) be in a dehydrated powder form before their combination. This dehydration not only converts the contaminants from the hydroxide sludge (10) into the oxide form, which is glass-compatible, but also reduces the amount of heat energy input required for melting the glass-making oxides by eliminating the need for water evaporation from these components.

Without wishing to be bound by theory, the inventor believes that the chemical reaction at melting of the oxides formed from the sodium tetraborate or sodium metaphosphate (12) with the contaminant oxides (11) and the glass-making oxides (14) in stoichiometric quantities results in the contaminants originally present in the metallic hydroxide sludge waste (10) alloyed within the chemical structure of a glass composition (20) upon cooling.

The use of sodium tetraborate or sodium metaphosphate (12) in a preferred embodiment results from the determination that the addition of these compounds provide oxides which improve the alloying capability of the contaminants into a glass composition (20) by their ability to donate certain desired oxides to the glass-forming mixture. When the sodium borate and phosphate compounds melt, they break down to phosphorous pentoxide ($P_2O_5$) and boric oxide ($B_2O_3$) which in the molten state will readily combine with the glass making oxides and the sludge contaminant oxides, such as chromic oxide ($Cr_2O_3$), lead oxide ($PbO$), aluminum oxide ($Al_2O_30$), copper oxide ($CuO$) and cadmium oxide ($CdO$). Thus, the heat of the melting causes all constituents to revert to their oxide state and they react accordingly as glass-making oxides. This improved alloying capability therefore results from the ability of the borate and/or phosphate anions to form compounds which can bind with the oxides of the contaminants in combination with the ability of sodium tetraborate and sodium metaphosphate to contribute boric oxide ($B_2O_3$) and phosphorous pentoxide ($P_2O_3$) to other glass-making oxides used to form a glass structure. Therefore, in alternative embodiments, other ionic binders could be used to bind the ionic contaminants which are also able to contribute glass-making oxides to a glass composition. Possible alternative compounds are selected from the group consisting of potassium metaborate ($KBO_2$), potassium phosphate ($K_3PO_4$), potassium metaphosphate ($KPO_3$), sodium metaborate ($NaBO_2$), sodium perborate ($NaBO_3$), sodium orthophosphate ($Na_2PO_4$), and sodium pyrophosphate ($Na_4P_2O_7$).

In addition, sodium tetraborate and sodium metaphosphate reduce the melting point of the oxide mixture from which glass is made. Therefore, the amount of sodium tetraborate or sodium metaphosphate used in the preferred embodiment must be sufficient to reduce the melting point to the temperature necessary for formation of the desired glass. The required amount is predetermined by chemical analysis of the metallic hydroxide sludge (10), such that the sodium tetraborate or sodium metaphosphate molecules (12) are numerous enough to react with all of the oxide contaminant molecules (11) from the metallic hydroxide sludge (10) as well as numerous enough to stoichiometrically contribute boric oxide or phosphorous pentoxide to the other glass-making oxides (14) used for making the desired glass composition (20). It is undesirable to add excess amounts of sodium tetraborate or sodium metaphosphate (12) to the contaminant oxides (11) because the excess appears in the form of a slag, which must be separated from the metallic ion borates or phosphates. Further, the presence of excess sodium tetraborate or sodium metaphosphate (12) in a glass-making oxide mixture removes the mixture from the proper eutectic point desired for forming the particular desired glass composition, resulting in encapsulation of some of the ionic contaminants within the glass as solid particles instead of the desired alloying of these contaminants.

The glass-making oxides (14) used in the present invention are well known to those skilled in the art. These oxides are added preferably in stoichiometric ratios and the resulting mixture heated to preselected elevated temperatures to form the glass oxide melt (18). Upon cooling the glass oxide melt (18) forms one of several selected glass compositions (20) which incorporate the ionic contaminants into the chemical structure of the glass composition (20).

When alloyed into the glass composition itself, the contaminants are resistant to dissolution, erosion or corrosion forces, as well as leaching by rainwater, and the glass composition can therefore be discarded and landfilled almost anywhere. In one embodiment, the glass oxide melt (18) is poured into brickmolds and cooled, thus providing glass bricks that are conveniently handled for disposal. Alternatively, specially shaped molds and coloring additives well known to those skilled in the art are used for the forming of decorative, colorful artistic sculpting or figurine material.

In a preferred embodiment, the glass-making oxides (14) used in the present invention are selected from the group consisting of silicon dioxide ($SiO_2$), sodium oxide ($Na_2O$), boric oxide ($B_2O_3$) and phosphorous pentoxide ($P_2O_5$). Alternatively, other glass-making oxides which are capable of bonding the ionic contaminants into a glass composition can be utilized, such as calcium oxide (CaO), potassium oxide ($K_2O$), and aluminum oxide ($Al_2O_3$).

The glass-making oxides (14) are provided by the addition of these oxides directly, such as in the case of silicon dioxide, or in the alternative, are provided by the addition of oxide source compounds which react or degrade to yield the desired glass-making oxides. For instance, boric oxide and phosphorous pentoxide are provided via the addition of the sodium tetraborate and sodium metaphosphate in a preferred embodiment. A preferred source of sodium oxide is sodium carbonate ($Na_2CO_3$) which degrades by releasing carbon dioxide sodium oxide ($Na_2O$).

Acceptable glass formulations for containing the ionic contaminants are documented in "PHASE DIAGRAMS FOR CERAMISTS," by Ernest M. Levin, Howard F. McMurdie and F. P. Hall; Margie K. Reser, editor; Herbert Insley, consulting editor; American Ceramic Society, Columbus, Ohio, 1956, which is incorporated by reference herein, and is hereinafter referred to as "the reference." In a preferred embodiment of this invention, several glass formulations containing the above-mentioned glass-making oxides are utilized. These formulations are well known to those skilled in the art and are set forth in the reference as follows: a $Na_2O$-CaO-$SiO_2$ composition shown FIG. 482; a CaO-$B_2O_3$-$SiO_2$ composition shown in FIGS. 646, 647, 648 and 649; a $Na_2O$-CaO-$B_2O_3$-$SiO_2$ composition shown in FIG. 852; a $Na_2O$-$BO_2O_3$-$SiO_2$ composition shown in FIG. 515; and a $Na_2O$-CaO-$P_2O_5$ glass composition shown in FIG. 486. Alternatively, other glass formulations could be used involving different combinations of these and additional glass-making oxides which are also able to accept the ionic contaminants directly into the glass structure.

Under the method of the present invention, the contaminants are alloyed into a glass composition through the substitution of the contaminant oxides for other oxide components being contributed to form the glass. During the melting of the contaminant oxide/sodium borate or sodium phosphate/glass-making oxide mixture, contaminant oxides bind together and become substituted for some of the glass-making oxides which form the glass melt. These bonded contaminant oxides and glass-making oxides can then, as a unit, combine with additional quantities of glass-making oxides to form the alloyed glass.

The ability of the glass-making oxides utilized in the preferred embodiment to chemically bond with those ionic contaminants previously set forth is shown in several Figures in the reference and are summarized in Table I as follows:

TABLE I

| FIG.(S) | GLASS-MAKING OXIDE(S) | CONTAMINANT(S) |
|---|---|---|
| | ALLOYING METALLIC CONSTITUENT ELEMENTS WITH GLASS-MAKING OXIDES | |
| 128 | $SiO_2$ | Mg, Fe |
| 42, 43 | CaO | Cu, Mg, Al, Ni |
| 1228 | $P_2O_5$ | Al |
| 57 | $B_2O_3$ | Cd |
| 165 | $B_2O_3$ | K |
| 167 | $SiO_2$ | K |
| 391 | CaO, $SiO_2$ | K |
| 5 | $SiO_2$ | Cu |
| 122 | $SiO_2$ | Cr |
| 1223 | $P_2O_5$ | Cr |
| 343 | CaO | Cr, Fe |
| 344, 345 | $SiO_2$ | Cr, Fe |
| 294 | $SiO_2$ | Mn |
| 1230, 1231 | $P_2O_5$ | Zn, Mn |
| 106 | $B_2O_3$ | Zn |
| 107 | $SiO_2$ | Zn |
| 1216, 1217 | $P_2O_5$ | Zn, Pb |
| 409 | $B_2O_3$ | Zn |
| 296 | $SiO_2$ | Zn |
| 284 | $SiO_2$ | Pb |
| 281 | $B_2O_3$ | Pb |
| 288 | $P_2O_5$ | Pb |
| 1232 | $P_2O_5$ | Pb |

In order to alloy the ionic contaminants within the glass composition (20), a glass composition must be selected which is capable of alloying each of the elements present in the metallic hydroxide sludge (10). Therefore, a chemical analysis of the type presently known to those skilled in the art is performed initially on each batch of metallic hydroxide sludge (10) to determine those ionic contaminants present, so that a glass composition (20) can be selected which will alloy each of these elements into its structure. Preferably, the glass-making oxides (14) can then be added in the precise quantities needed, to the sodium borate or sodium phosphate (12) and the contaminant oxides (11), to accomplish a stoichiometric mixture for forming glass composition (20). When more than one glass composition is available for alloying all of the ionic contaminants present in the metallic hydroxide sludge, it is preferred that the glass composition having the lowest melting point is selected to minimize the required amount of heat energy input for forming the glass.

As previously stated, the sodium borate or sodium phosphate (12) is added in a dehydrated powder form at room temperature and pressure to the contaminant oxides (11) and glass-making oxides or oxide source compounds (14), which are also in dehydrated powder form. A stoichiometrical addition of silicon dioxide and sodium oxide is first performed by the addition of silicon dioxide and sodium carbonate at room temperature to precipitate the excess quantities of calcium oxide present from the initial addition of lime to the metal processing waste solutions. This first addition also establishes a minimum melting point for the mixture.

Following the first addition of silicon dioxide and sodium oxide, further additions of sodium oxide, boric oxide and phosphorous pentoxide are then added in preferably stoichiometric quantities. These additions are needed to improve the alloying capability of the glass with the contaminants present to form the desired glass composition. The mixture is then heated to the melting temperature appropriate for the glass composition (20) being made, thus forming a glass oxide melt (18). This heating can be accomplished by any practical means, including placing the mixture in a graphite crucible adjacent to an induction coil. A preferred method for heating the mixture is to place the mixture in an electrofurnace.

Because the ionic contaminants are being alloyed directly into the glass composition (20) in a preferred embodiment of this invention, it is desirable that the ionic contaminants be added in stoichiometric proportions to the glass making oxides (14). This prevents the presence of excess contaminant quantities which would fail to enter the chemical structure of glass composition (20) and would therefore need to be skimmed off the top of the glass oxide melt (18) by a separate operation. If excess quantities of ionic contaminants were allowed to be present they would not be converted into an inert form for disposal or other use, and would have to enter a subsequent glass-making operation.

The present invention overcomes disadvantages associated with previous methods of disposal of metal processing solutions by providing a new method for rendering the ionic contaminants contained therein in an inert form for disposal. Further, the glass material produced by the method of the present invention provides an improved method for disposing of the ionic contaminants elements present in metal processing solutions. In addition, the method of the present invention accomplishes the disposal of the ionic contaminants from metal processing solutions in a cost effective manner.

Further understanding of the present invention will be had by reference to the following Examples which are set forth herein for purposes of illustration of the present invention but are not to be construed as limiting thereto.

EXAMPLE I

A 100 g sample of dried metallic hydroxide sludge was obtained and chemically analyzed to show contaminants present in the sludge in the following amounts:

| CONTAMINANT | AMOUNT |
| --- | --- |
| Cd | 17.6 ppm |
| Zn | 0.02 ppm |
| Pb | 70.0 ppm |
| Cr | 46.6 ppm |
| Ni | 90 ppm |
| Cu | 1540 ppm |
| Ca | remainder |

All contaminants are present within the dried metallic hydroxide sludge in the oxide form.

The following amounts of chemical additions were made to the dried sludge to produce a basic glass formula with a lowest minimum melting point of 725° C.:
978 g sodium carbonate ($Na_2CO_3$);
1976.14 g silicon dioxide ($SiO_2$);
0.70 g sodium tetraborate ($Na_2B_4O_7$); and
0.012 g sodium orthophosphate ($Na_2PO_4$).
These additions supplied sufficient sodium tetraborate and sodium orthophosphate and extra silicon dioxide to combine with and alloy with the basic glass composition.

The mixture was then placed in a glass melting furnace and melted, upon which 2.14 g of silicon dioxide reacted with the copper oxide ($Cu_2O$) and chromium oxide ($Cr_2O_3$). The 0.70 g of sodium tetraborate and 0.012 g of sodium orthophosphate reacted with the remaining oxides of cadmium, zinc, lead, nickel and calcium present in the sludge.

The mixture was then removed from the furnace, poured into a brickmold, and cooled at room temperature for 30 minutes, after which time the glass material was removed. Upon analysis of the glass material, it was determined that the ionic contaminants were in inert form, bonded directly into the chemical structure of the glass.

EXAMPLE II

A 100 g sample of dried metallic hydroxide sludge was analyzed to contain the following:

| Contaminants | Amount |
| --- | --- |
| Mg | 9.36% |
| Fe | 5.21% |
| Al | 0.63% |
| Cu | 2.80% |
| Ni | 3.94% |
| Si | 0.74% |
| P | 0.11% |
| S | 0.11% |
| Cd | 0.11% |
| K | 0.74% |
| Ca | 75.06% |
| Ti | 0.09% |
| Cr | 0.89% |
| Mn | 0.21% |

The following amounts of chemical additions were made to the sample of dried sludge to produce a basic glass formula with a minimum (lowest) melting point as well as supplying sufficient sodium tetraborate ($Na_2B_4O_7$) and extra silicon dioxide ($SiO_2$) to combine with and alloy with the basic glass composition:
736.02 g $Na_2CO_3$
1709.58 g $SiO_2$
14.93 g $Na_2B_4O_7$ A Taylor Winfield induction heating machine with 25 kilowatts power was used to melt the glass mixture within one minute. The melted mixture was then removed from the induction heating machine and allowed to cool, thus forming a glass composition containing the original contaminants alloyed within its chemical structure.

EXAMPLE III

The process of Example II is repeated in general form using boric oxide, calcium oxide, phosphorous pentoxide, sodium oxide and silicon dioxide as the glass making oxides. These glass-making oxides are utilized to sequentially form each of the glass compositions as follows: sodium oxide - calcium oxide - silicon dioxide; calcium oxide boric oxide silicon dioxide; sodium oxide - calcium oxide - boric oxide - silicon dioxide; sodium oxide - boric oxide - silicon dioxide; and sodium oxide - calcium oxide - phosphorous pentoxide. The final glass compositions are found to chemically bond the ionic contaminants in the glass.

EXAMPLE IV

Over a one year period various sludge waste samples are collected and analyzed to contain the range of contaminants set forth in Table I below.

TABLE I

| Minimum | Contaminant | Maximum |
| --- | --- | --- |
| 0 | Mg | 9.36% |
| 0 | Fe | 5.21% |
| 0 | Al | 0.63% |
| 0.1549% | Cu | 2.80% |
| 0.009% | Ni | 3.94% |
| 0 | Si | 0.74% |
| 0 | P | 0.11% |
| 0 | S | 0.11% |
| 0.0017% | Cd | 0.11% |
| 0 | K | 0.74% |
| 0 | Ca | 74.96% |
| 0 | Ti | 0.09% |
| 0.00406% | Cr | 0.89% |
| 0 | Mn | 0.21% |
| 0.000002% | Zn | — |
| 0.007% | Pb | — |

Following the teachings herein each of the various sludges are analyzed to determine the amount of ionic contaminants present. Thereafter, the samples are dried. Effective amounts of sodium tetraborate are added producing a metallic ion borate composition. The appropriate glass formulation is selected and effective amounts of silicon dioxide and sodium carbonate are added to react with the calcium oxide present, thus establishing the appropriate melting point. Stoichiometric quantities of boric oxide and phosphorous pentoxide are added and the mixture is heated to an effective temperature for forming the glass composition. The glass composition is found to chemically bond all of the above contaminants for forming a generally inert chemical composition.

While the above detailed description describes a preferred embodiment of the present invention, it will be understood that the description is exemplary in nature and is not intended to limit the scope of the invention. The present invention will therefore be understood as susceptible to modification, alteration and variation by those skilled in the art without deviating from the scope and meaning of the following claims.

What is claimed is:

1. A method for chemically stabilizing a waste material comprising the steps of:
providing a waste material having at least one hydroxide, each hydroxide having a contaminant;
forming a glass-compatible mixture containing each contaminant from each hydroxide; and
alloying each contaminant from the glass-compatible mixture within a glass composition.

2. The method of claim 1 wherein each contaminant is selected from the group consisting of aluminum, cadmium, calcium, chromium, copper, iron, lead, magnesium, manganese, nickel, phosphorous, potassium, silicon, sulfur, tin, titanium and zinc.

3. The method of claim 1 wherein the step of forming a glass-compatible mixture comprises converting each contaminant to oxide form and combining each contaminant oxide with at least one ionic binder and at least one glass-making oxide, each ionic binder capable of donating a glass-compatible oxide to a glass composition.

4. The method of claim 3 wherein each glass-making oxide is selected from the group consisting of boric oxide, calcium oxide, phosphorous pentoxide, sodium oxide and silicon dioxide.

5. The method of claim 3 wherein each ionic binder is selected from the group consisting of sodium tetraborate and sodium metaphosphate.

6. The method of claim 3 wherein each ionic binder has the chemical formula AX, where A is a cation selected from the group consisting of sodium and potassium and X is a complex anion selected from the group consisting of tetraborate, pentaborate, metaborate, perborate, peroxyborate, orthophosphate, metaphosphate and pyrophosphate.

7. The method of claim 3 wherein the step of alloying each contaminant from the glass-compatible mixture within a glass composition comprises the steps of:
melting the glass-compatible mixture, thereby causing each ionic binder to form a glass-compatible oxide, thus forming a glass oxide melt; and
cooling the glass oxide melt to form a glass composition containing each contaminant within the glass composition.

8. The method of claim 1 wherein the glass composition contains glass selected from the group consisting of sodium oxide calcium oxide silicon dioxide; calcium oxide - boric oxide - silicon dioxide; sodium oxide calcium oxide boric oxide silicon dioxide; sodium oxide - boric oxide - silicon dioxide; and sodium oxide - calcium oxide - phosphorous pentoxide.

9. A method for chemically stabilizing a waste material including at least one hydroxide, each hydroxide having a contaminant, said method comprising the steps of:
converting the contaminants to oxide form;
combining the contaminant oxides with sodium tetraborate and at least one glass-making oxide to form a glass-compatible mixture;
melting the glass-compatible mixture, thereby causing the sodium tetraborate to form a glass-compatible oxide, thus forming a glass oxide melt; and
cooling the glass oxide melt to form a glass composition containing each contaminant within the glass composition.

10. A method for chemically stabilizing a waste material including at least one hydroxide, each hydroxide having a contaminant, said method comprising the steps of:
converting the contaminants to oxide form;
combining the contaminant oxides with sodium orthophosphate and at least one glass-making oxide to form a glass-compatible mixture;
melting the glass-compatible mixture, thereby causing the sodium orthophosphate to form a glass-compatible oxide, thus forming a glass oxide melt; and
cooling the glass oxide melt to form a glass composition containing each contaminant within the glass composition.

11. A method for chemically stabilizing a waste material having at least one hydroxide, each hydroxide having a contaminant selected from the group consisting of aluminum, cadmium, calcium, chromium, copper, iron, lead, magnesium, manganese, nickel, phosphorous, potassium, silicon, sulfur, tin, titanium and zinc, said method comprising the steps of:
converting the contaminants to oxide form;
combining the contaminant oxides with at least one ionic binder and at least one glass-making oxide, each ionic binder having the chemical formula AX, where A is a metal selected from the group consisting of sodium and potassium and X is a complex anion selected from the group consisting of tetraborate, pentaborate, metaborate, perborate, peroxyborate, orthophosphate, metaphosphate and pyrophosphate, each glass-making oxide selected from the group consisting of boric oxide, calcium oxide, phosphorous pentoxide, sodium oxide and silicon dioxide, thereby forming a glass-compatible mixture containing each contaminant from each hydroxide;

melting the glass-compatible mixture, thereby causing each ionic binder to form a glass-compatible oxide, thus forming a glass oxide melt; and cooling the glass oxide melt to form a glass composition, such glass composition containing a glass selected from the group consisting of sodium oxide calcium oxide - silicon dioxide; calcium oxide - boric oxide - silicon dioxide; sodium oxide - calcium oxide boric oxide - silicon dioxide; sodium oxide - boric oxide silicon dioxide; and sodium oxide calcium oxide each ionic contaminant.

* * * * *